(12) United States Patent
Sikkema

(10) Patent No.: US 9,187,599 B2
(45) Date of Patent: Nov. 17, 2015

(54) PROCESS FOR CROSSLINKING A POLYMER COMPRISING PYRIDYL GROUPS

(71) Applicant: MxPolymers B.V., Wageningen (NL)

(72) Inventor: Doetze Jakob Sikkema, Wageningen (NL)

(73) Assignee: MxPolymers B.V., Wageningen (NL)

( * ) Notice: Subject to any disclaimer, the term of this patent is extended or adjusted under 35 U.S.C. 154(b) by 0 days.

(21) Appl. No.: 14/351,526

(22) PCT Filed: Oct. 10, 2012

(86) PCT No.: PCT/NL2012/050703
§ 371 (c)(1),
(2) Date: Apr. 11, 2014

(87) PCT Pub. No.: WO2013/055209
PCT Pub. Date: Apr. 18, 2013

(65) Prior Publication Data
US 2014/0243487 A1     Aug. 28, 2014

Related U.S. Application Data

(60) Provisional application No. 61/546,145, filed on Oct. 12, 2011.

(30) Foreign Application Priority Data

Oct. 12, 2011   (EP) ..................................... 11184901

(51) Int. Cl.
    C08G 73/06    (2006.01)
    C08G 65/48    (2006.01)
(52) U.S. Cl.
    CPC .......... C08G 73/0627 (2013.01); C08G 65/485 (2013.01)
(58) Field of Classification Search
    CPC ......................... C08G 65/485; C08G 73/0627
    USPC ........................................................ 525/534
    See application file for complete search history.

(56) References Cited

U.S. PATENT DOCUMENTS 3,770,666 A    11/1973  Quentin
4,452,725 A *   6/1984  Wellinghoff et al. ......... 252/500
                         (Continued)

FOREIGN PATENT DOCUMENTS

WO    WO-2009/096786 A1    8/2009

OTHER PUBLICATIONS

Hallensleben, M. "Polymere elektron-donor-acceptor-komplexe-I", European Polymer Journal, Pergamon Press Ltd. Oxford, GB, vol. 7, No. 8, 1971, pp. 1197-1203.
(Continued)

*Primary Examiner* — Mike M Dollinger
(74) *Attorney, Agent, or Firm* — Gilberto M. Villacorta; Sunit Talapatra; Foley & Lardner LLP

(57) ABSTRACT

The present invention relates to process for crosslinking an arylene oxide polymer comprising a 3-pyridyl and/or a 4-pyridyl group, wherein the polymer is reacted with a compound according to Formula (1) or a compound according to Formula (2), wherein $R^1$, $R^2$, $R^3$ and $R^4$ are independently selected from the group consisting of hydrogen, halogen, hydroxy and cyano. The crosslinked arylene oxide polymer can be used as a membrane, in particular a proton conducting membrane.

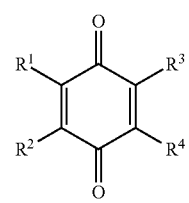

(1)

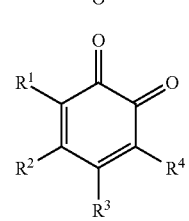

(2)

18 Claims, 1 Drawing Sheet

(56) References Cited

U.S. PATENT DOCUMENTS

| | | | |
|---|---|---|---|
| 4,474,869 A | | 10/1984 | Brault et al. |
| 4,499,008 A | * | 2/1985 | Wellinghoff et al. ......... 252/500 |
| 7,067,608 B2 | * | 6/2006 | Bender ........................ 528/125 |
| 2010/0047660 A1 | | 2/2010 | Geormezi et al. |

OTHER PUBLICATIONS

International Search Report of PCT/NL2012/050703 dated Nov. 22, 2012.

* cited by examiner

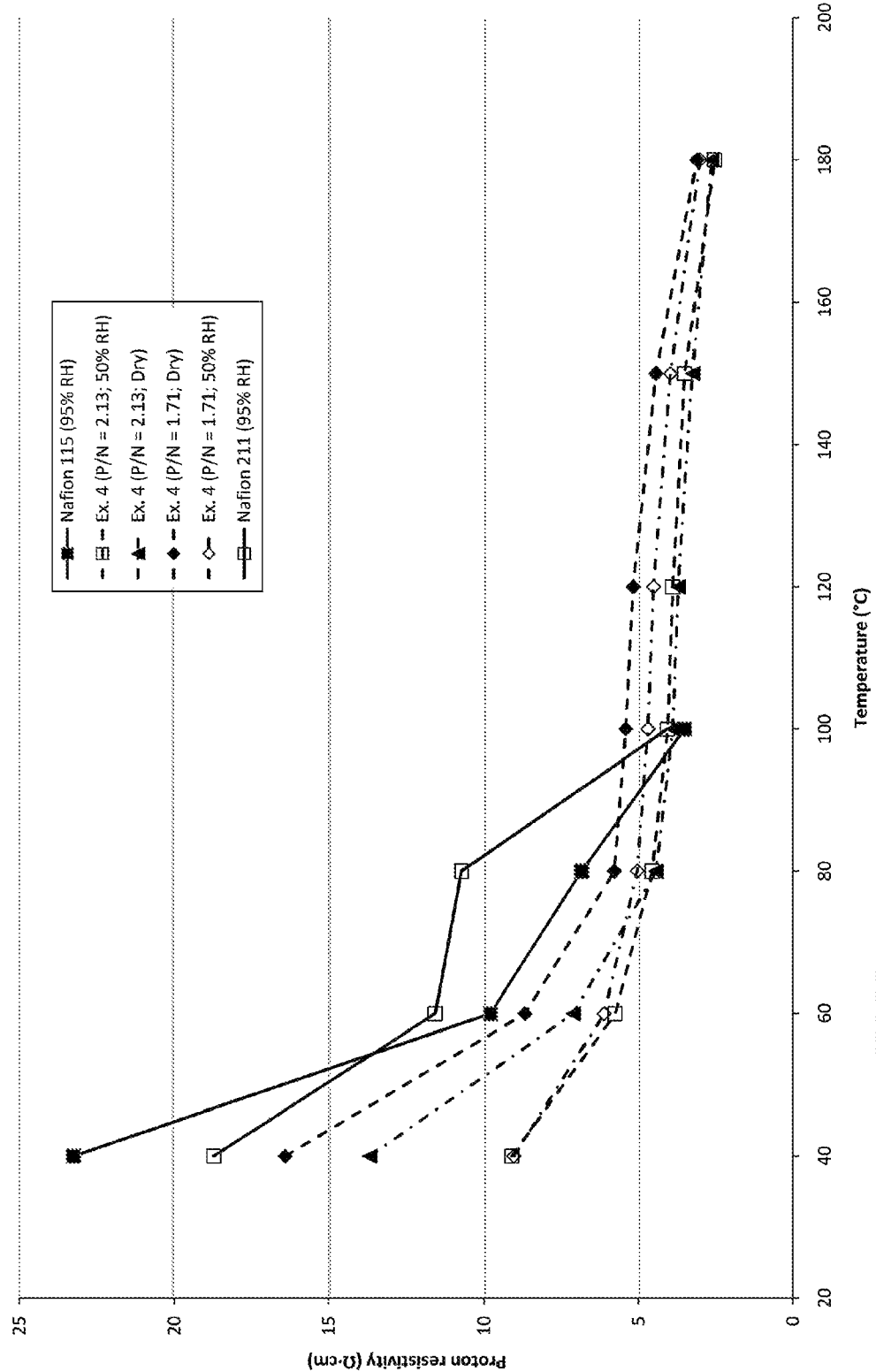

PROCESS FOR CROSSLINKING A POLYMER COMPRISING PYRIDYL GROUPS

CROSS REFERENCE TO RELATED APPLICATIONS

The present application is a National Stage of International Application No. PCT/NL2012/050703 filed on Oct. 10, 2012, which claims the benefit of European Patent Application No. 11184901.4 filed Oct. 12, 2011, and which claims the benefit of U.S. Appln No. 61/546,145, filed Oct. 12, 2011, the entire disclosures of which are incorporated herein by reference.

FIELD OF THE INVENTION

The present invention relates to a process for crosslinking a polymer comprising pyridyl groups. The present invention further relates to crosslinked polymers obtainable according to this process and to membranes and ionic resins comprising these crosslinked polymers.

BACKGROUND OF THE INVENTION

Polymers comprising pyridyl groups have many applications, based on their basicity. When used in ion exchanging membranes or ion conducting membranes, these polymers must have a relatively rigid structure.

For example, it is known in the art to prepare crosslinked polymers comprising pyridyl groups by copolymerising polyvinylpyridine in the presence of divinyl monomers such as divinyl benzene. If more intricate shapes of the crosslinked polymers are desired, e.g. in films, shaping of the polymer must precede crosslinking. Very often linear poly(4-pyridine)s are then employed which are first formed into a film by e.g. casting and then crosslinked. In such a process, it is highly desirable that the crosslinking agent can mixed homogeneously into the polymer mass (melt or solution) to ensure a high homogeneity in the final product.

U.S. Pat. No. 3,770,666, incorporated by reference, discloses crosslinking of a copolymer of vinyl alcohol and 4-vinylpyridine via hydroxy groups by using chlorinated polyethylene oxide.

U.S. Pat. No. 4,474,869, incorporated by reference, discloses crosslinking of polyvinylpyridines by electron beam, ion beam or x-ray irradiation.

Hallensleben, Eur. Pol. J., 7, 1197-1203, 1971, incorporated by reference, discloses that the reaction of poly(4-vinylpyridine) with 2,3,5,6-tetrachlorocyclohexa-2,5-diene-1,4-dione (chloranil) or 2,3-dichloro-5,6-dicyano-cyclohexadiene-2,5-diene-1,4-dione (DDQ) produces black, insoluble products, whereas the reaction of poly(4-vinylpyridine) with tetracyanoethene produces an electron-donor-acceptor complex that is soluble in polar, aprotic solvents such as DMF and DMSO. It is suggested that tetracyanoethene is capable of reversibly crosslinking poly(4-vinylpyridine).

L. E. Bromberg and M. G. Goldfield, J. Phys. Chem. B, 101, 966-970, 1997, incorporated by reference, disclose electron transfer reactions between poly(4-vinylpyridine)/divinyl benzene gels and various quinone derivatives which result into the formation of additional crosslinks within the gels. The quinone derivatives investigated were 2,3,5,6-tetrachlorocyclohexa-2,5-diene-1,4-dione (chloranil), 2,3-dichloro-5,6-dicyano-cyclo-hexadiene-2,5-diene-1,4-dione (DDQ) and 7,7,8,8-tetracyanoquinodimethane.

WO 2009/096786, incorporated by reference, discloses novel phenol compounds and (co)polymers comprising these novel phenol compounds.

Accordingly, there is a need in the art for a process for crosslinking polymer comprising 3-pyridyl and/or 4-pyridyl groups.

SUMMARY OF THE INVENTION

The present invention relates to a process for crosslinking an arylene oxide polymer comprising a 3-pyridyl and/or a 4-pyridyl group, wherein the polymer is reacted with a compound according to Formula (1) or a compound according to Formula (2):

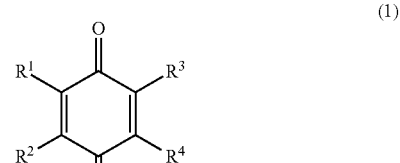

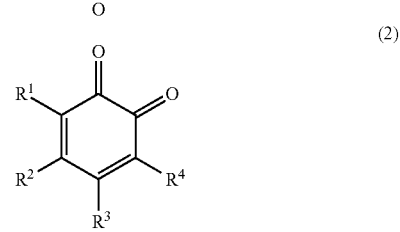

wherein $R^1$, $R^2$, $R^3$ and $R^4$ are independently selected from the group consisting of hydrogen, halogen, hydroxy and cyano.

The present invention further relates to a crosslinked polymer obtainable according to the process according to the present invention. The present invention further relates to a membrane and an ionic resin comprising the crosslinked polymer according to the present invention.

BRIEF DESCRIPTION OF THE DRAWINGS

FIG. 1 compares the proton conductivity of a film according to the present invention compared to a Nafion® membrane (types 115 and 211).

DETAILED DESCRIPTION OF THE INVENTION

The verb "to comprise" as is used in this description and in the claims and its conjugations is used in its non-limiting sense to mean that items following the word are included, but items not specifically mentioned are not excluded. In addition, reference to an element by the indefinite article "a" or "an" does not exclude the possibility that more than one of the element is present, unless the context clearly requires that there is one and only one of the elements. The indefinite article "a" or "an" thus usually means "at least one".

The term "polymer" as used in this document is intended to encompass homopolymers (i.e. polymers that constitute only a single monomer) and copolymers (i.e. polymers that constitute two or more monomers). The polymers may have a linear, branched, hyperbranched, dendritic, dendronised or a brush-type structure.

The term "halogen" as used in this document represents the elements fluorine, chlorine, bromine and iodine.

Alkyl groups and aryl groups (including phenyl groups) may optionally be substituted, preferably with one or more halogen atoms, wherein the halogen atoms are preferably selected from the group consisting of fluorine, chlorine and bromine atoms, most preferably chlorine and bromine, and $C_1$-$C_{10}$ alkyl groups, wherein the alkyl groups may be linear or branched. The alkyl groups are, however, preferably not α-branched. The alkyl group may also comprise a cyclic group, provided it comprises at least three carbon atoms. In this document, the term "alkyl group" denotes $C_1$-$C_{10}$ alkyl groups and the term "aryl group" denotes $C_6$-$C_{12}$ aryl groups.

The Process

In the compound according to Formula (1) or the compound according to Formula (2), it is preferred that at least one of $R^1$, $R^2$, $R^3$ and $R^4$ is halogen or cyano, preferably halogen. According to a more preferred embodiment, at least two of $R^1$, $R^2$, $R^3$ and $R^4$ are halogen or cyano, preferably halogen. According to a yet even more preferred embodiment, at least three of $R^1$, $R^2$, $R^3$ and $R^4$ are halogen. According to a most preferred embodiment, all four of $R^1$, $R^2$, $R^3$ and $R^4$ are halogen.

According to the present invention, it is preferred that halogen is either chlorine or bromine, preferably chlorine.

The compounds according to Formula (1) are preferred over the compounds according to Formula (II).

Preferably, the compound according to Formula (II) is selected from the group consisting of 2,3-dichloro-5,6-dicyano-cyclohexadiene-2,5-diene-1,4-dione (DDQ), 2,3,5,6-tetrachlorocyclohexa-2,5-diene-1,4-dione (chloranil), or a combination thereof.

The arylene oxide polymer according to the present invention is preferably an arylene oxide polymer comprising an arylene oxide group according to Formula (3):

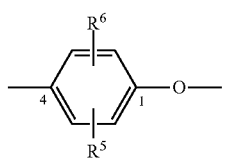

(3)

wherein:
$R^5$ is selected from the group consisting of 3-pyridyl and 4-pyridyl groups, wherein $R^5$ is at position 2 or 3 of the arylene oxide group;
$R^6$ is selected from the group consisting of 3-pyridyl, 4-pyridyl and phenyl groups,
wherein $R^6$ is at position 5 or 6 of the arylene oxide group.

According to the present invention, it is preferred that the arylene oxide group is substituted at one or two positions, independently selected from positions 2, 3, 5 and 6, with a halogen atom, a $C_6$-$C_{12}$ aryl group or a $C_1$-$C_{10}$ alkyl group.

It is preferred that $R^6$ is selected from the group consisting of 3-pyridyl and 4-pyridyl groups. It is furthermore preferred that $R^5$ and $R^6$ are a 3-pyridyl group.

Preferably, $R^5$ is at position 2 of the arylene oxide group. Also preferably, $R^6$ is at position 6 of the arylene oxide group.

The arylene oxide polymer according to the present invention has generally a number average molecular weight $M_n$ of about 7,000 to about 300,000 and a weight average molecular weight $M_w$ of about 15,000 to about 1,000,000.

According to the present invention, a preferred class of arylene oxide polymers comprising a 3-pyridyl and/or a 4-pyridyl group is a copolymer according to Formula (4):

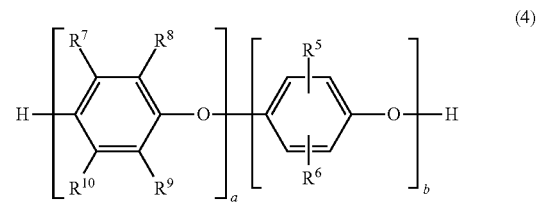

(4)

wherein:
$R^5$ is selected from the group consisting of 3-pyridiyl and 4-pyridyl groups, wherein $R^5$ is at position 2 or 3 of the arylene oxide group;
$R^6$ is selected from the group consisting of 3-pyridiyl, 4-pyridyl and phenyl groups,
wherein $R^6$ is at position 5 or 6 of the arylene oxide group;
the arylene oxide group bearing $R^5$ and $R^6$ is optionally substituted at one or two positions, independently selected from positions 2, 3, 5 and 6, with a halogen atom, a $C_6$-$C_{12}$ aryl groups or a $C_1$-$C_{10}$ alkyl group; and one or two substituents selected from the group consisting of $R^7$, $R^8$, $R^9$ and $R^{10}$ are a phenyl group, whereas the other substituents selected from the group consisting of $R^7$, $R^8$, $R^9$ and $R^{10}$ are selected from the group of hydrogen, halogen and $C_1$-$C_{10}$ alkyl groups.

In this preferred class of arylene oxide polymers, it is preferred that $R^5$ is selected from the group consisting of 3-pyridiyl and 4-pyridyl groups.

In this preferred class of arylene oxide polymers, it is also preferred that $R^5$ and $R^6$ are a 3-pyridyl group.

In this preferred class of arylene oxide polymers, it is also preferred that $R^5$ is at position 2 of the arylene oxide group. It is also preferred that $R^6$ is at position 6 of the arylene oxide group.

According to the present invention, $R^8$ and $R^9$ are preferably independently selected from the group of phenyl groups.

According to the present invention, $R^7$ and $R^{10}$ are preferably selected from the group of hydrogen, halogen, $C_6$-$C_{12}$ aryl groups and $C_1$-$C_{10}$ alkyl groups.

The present invention also relates to a crosslinked polymer obtainable according to the process according to the present invention.

The present invention further relates to a membrane and an ionic resin comprising this crosslinked polymer.

The present invention also relates to a membrane electrode assembly comprising the crosslinked polymer.

EXAMPLES

Example 1

10 g of a solution of 10 wt. % poly(4-vinylpyridine) in NMP (N-Methyl-2-pyrrolidone) was mixed with 5 g of a solution of 2 wt. % 2,3,5,6-tetrachlorocyclohexa-2,5-diene-1,4-dione (chloranil) in NMP at ambient temperature under vigorous stirring for five seconds. After twenty seconds, the mixture was cast using a 500 μm doctor blade on a polytetrafluoroethylene film support to obtain a crosslinked film. The film was consolidated for 30 minutes, where after the NMP was removed and the film was washed with water to remove any residual NMP and subsequently dried (100° C., 15 minutes) which gave a film having a thickness of 35 μm.

Example 2

A solution of 10 mmol 2-methyl-pyridine in 10 ml DMSO (Dimethylsulfoxide) was treated with 3 mmol chloranil at ambient temperature. No reaction occurred, not even after two weeks as was established by $^1$H NMR.

Example 3

Example 1 was repeated but with poly(2-vinylpyridine) instead of poly(4-vinylpyridine) and with a solution of 10 wt. % 2,3,5,6-tetrachlorocyclohexa-2,5-diene-1,4-dione (chloranil) in NMP, to make a solution with a 10:1 wt. ratio of polymer to chloranil. No gelling or even a viscosity increase was observed, even not after two weeks.

Example 4

A solution of 1 g 1,4-poly[2,6-(3-pyridyl)phenylene oxide; prepared according to the method disclosed in Example 1 of WO 2009/096786] in 4 g NMP and a solution of 1 g 2,3,5,6-tetrachlorocyclohexa-2,5-diene-1,4-dione (chloranil) in 9 g NMP were prepared. An amount of 0.5 g of the polymer solution was mixed with 0.2 g of the chloranil solution at ambient temperature. After 30 s, the mixture was cast using a 250 μm doctor blade on a polytetrafluoroethylene film support to obtain a crosslinked film. The film was consolidated for 30 minutes, where after the NMP was removed and the film was washed with water to remove any residual NMP and subsequently dried (100° C., 15 minutes) which gave a film having a thickness of 50 μm.

Example 5

Example 4 was repeated. The film was, however, consolidated for 100 seconds at 160° C.

Example 6

The film according to Example 4 was subjected to proton conductivity measurements at various relative humidities. The film was first immersed for 5 seconds in 85% phosphoric acid, then conditioned at 180° C. for 1 h to obtain a dried film. The measurements were conducted in a Fumatech MK3 proton conductivity instrument coupled with a Gamry Reference 600 potentiostat/galvanostat ZRA. The film according to the present invention was also compared with a Nafion® membrane (types 115 and 211) at a relative humidity of 95%. All membranes had the same thickness (50 nm). The results are shown in FIG. 1. If the Nafion® membrane was not hydrated, hardly any conductivity was observed. The need for using hydrated Nafion® membranes limits its applicability to relative low temperatures which is undesirable in many applications.

The invention claimed is:

1. A process for crosslinking an arylene oxide polymer comprising a 3-pyridyl and/or a 4-pyridyl group, the process comprising reacting the polymer with a compound according to Formula (1) or a compound according to Formula (2):

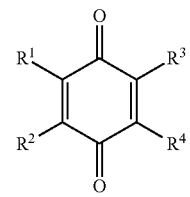

(1)

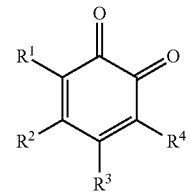

(2)

wherein $R^1$, $R^2$, $R^3$ and $R^4$ are independently selected from the group consisting of hydrogen, halogen, hydroxy and cyano.

2. The process according to claim 1, wherein the arylene oxide polymer comprising a 3-pyridyl and/or a 4-pyridyl group is reacted with 2,3-dichloro-5,6-dicyano-cyclohexadiene-2,5-diene-1,4-dione (DDQ), 2,3,5,6-tetrachlorocyclohexa-2,5-diene-1,4-dione (chloranil), or a combination thereof.

3. The process according to claim 1, wherein the arylene oxide polymer comprising a 3-pyridyl and/or a 4-pyridyl group is a polymer comprising an arylene oxide group according to Formula (3):

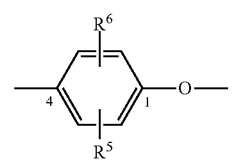

(3)

wherein:

$R^5$ is selected from the group consisting of 3-pyridyl and 4-pyridyl groups, wherein $R^5$ is at position 2 or 3 of the arylene oxide group;

$R^6$ is selected from the group consisting of 3-pyridyl, 4-pyridyl and phenyl groups, wherein $R^6$ is at position 5 or 6 of the arylene oxide group.

4. The process according to claim 3, wherein the arylene oxide group is substituted at one or two positions, independently selected from positions 2, 3, 5 and 6, with a halogen atom, a $C_6$-$C_{12}$ aryl group or a $C_1$-$C_{10}$ alkyl group.

5. The process according to claim 3, wherein $R^6$ is selected from the group consisting of 3-pyridyl and 4-pyridyl groups.

6. The process according to claim 3, wherein $R^5$ and $R^6$ are a 3-pyridyl group.

7. The process according to claim 3, wherein $R^5$ is at position 2 of the arylene oxide group.

8. The process according to claim 3, wherein $R^6$ is at position 6 of the arylene oxide group.

9. The process according to claim 3, wherein the arylene oxide polymer comprising a 3-pyridyl and/or a 4-pyridyl group is a copolymer according to Formula (4):

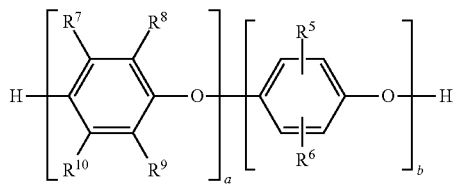
(4)

wherein:
$R^5$ is selected from the group consisting of 3-pyridiyl and 4-pyridyl groups, wherein $R^5$ is at position 2 or 3 of the arylene oxide group;
$R^6$ is selected from the group consisting of 3-pyridiyl, 4-pyridyl and phenyl groups, wherein $R^6$ is at position 5 or 6 of the arylene oxide group;
the arylene oxide group bearing $R^5$ and $R^6$ is optionally substituted at one or two positions, independently selected from positions 2, 3, 5 and 6, with a halogen atom, a $C_6$-$C_{12}$ aryl groups or a $C_1$-$C_{10}$ alkyl group; and
one or two substituents selected from the group consisting of $R^7$, $R^8$, $R^9$ and $R^{10}$ are a phenyl group, whereas the other substituents selected from the group consisting of $R^7$, $R^8$, $R^9$ and $R^{10}$ are selected from the group of hydrogen, halogen and $C_1$-$C_{10}$ alkyl groups.

10. The process according to claim 9, wherein $R^5$ is selected from the group consisting of 3-pyridiyl and 4-pyridyl groups.

11. The process according to claim 9, wherein $R^5$ and $R^6$ are a 3-pyridyl group.

12. The process according to claim 9, wherein $R^5$ is at position 2 of the arylene oxide group.

13. The process according to claim 9, wherein $R^6$ is at position 6 of the arylene oxide group.

14. The process according to claim 9, wherein $R^8$ and $R^9$ are independently selected from the group of phenyl groups.

15. The process according to claim 9, wherein $R^7$ and $R^{10}$ are selected from the group of hydrogen, halogen, $C_6$-$C_{12}$ aryl groups and $C_1$-$C_{10}$ alkyl groups.

16. A crosslinked polymer obtainable according to the process of claim 1.

17. A membrane comprising the crosslinked polymer according to claim 16.

18. An ionic resin comprising the crosslinked polymer according to claim 16.

* * * * *